United States Patent
Ma et al.

(10) Patent No.: US 8,595,330 B2
(45) Date of Patent: Nov. 26, 2013

(54) METHOD, SYSTEM AND APPARATUS FOR UPLOADING AND DOWNLOADING A CAPTION FILE

(75) Inventors: Huateng Ma, Shenzhen (CN); Yongyu Dai, Shenzhen (CN); Fuzhong Sheng, Shenzhen (CN); Tiange Si, Shenzhen (CN); Shuhui Mei, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 147 days.

(21) Appl. No.: 13/340,993

(22) Filed: Dec. 30, 2011

(65) Prior Publication Data

US 2012/0102158 A1    Apr. 26, 2012

Related U.S. Application Data

(63) Continuation of application No. PCT/CN2010/073510, filed on Jun. 3, 2010.

(30) Foreign Application Priority Data

Jul. 27, 2009    (CN) .......................... 2009 1 0089875

(51) Int. Cl.
   *H04L 29/06*    (2006.01)

(52) U.S. Cl.
   USPC ........... 709/219; 709/201; 709/203; 709/217; 709/218

(58) Field of Classification Search
   USPC .......................... 709/217, 218, 219, 201, 203
   See application file for complete search history.

(56) References Cited

U.S. PATENT DOCUMENTS

| | | | |
|---|---|---|---|
| 8,190,674 B2 * | 5/2012 | Narayanan et al. | 709/203 |
| 2004/0254887 A1 * | 12/2004 | Jacoby | 705/52 |
| 2005/0102379 A1 * | 5/2005 | Su et al. | 709/219 |

FOREIGN PATENT DOCUMENTS

| | | |
|---|---|---|
| CN | 1777943 A | 5/2006 |
| CN | 101179347 A | 5/2008 |
| CN | 101452726 A | 6/2009 |
| CN | 101616181 A | 12/2009 |
| KR | 20070059537 A | 6/2007 |
| WO | 2007/119893 A1 | 10/2007 |

OTHER PUBLICATIONS

First Chinese Office Action dated Dec. 31, 2011; Appln. No. 200910089875.2.
Second Chinese Office Action dated Aug. 21, 2012; Appln. No. 2009100898752.
International Search Report: mailed Sep. 2, 2010; PCT/CN2010/073510.

* cited by examiner

*Primary Examiner* — Kenny Lin
*Assistant Examiner* — Abdelnabi Musa
(74) *Attorney, Agent, or Firm* — Ladas & Parry LLP

(57) ABSTRACT

A method, system and apparatus for uploading and downloading a caption file are disclosed. The method includes: receiving, by a caption server, file information of a multimedia file and file information of a caption file corresponding to the multimedia file from a client end player; determining, by the caption server, whether the caption server has the caption file according to the file information of the caption file and transmitting a status message indicating whether the caption server has the caption file to the client end player, to enable the client end player to upload the caption file when determining according to the status message that the caption server does not have the caption file. In the solution of the present disclosure, the client end player can upload and download the caption file automatically. The user does not need to search for and download the caption file manually, which improves the user's experience and saves resources of the caption server.

5 Claims, 7 Drawing Sheets

METHOD, SYSTEM AND APPARATUS FOR UPLOADING AND DOWNLOADING A CAPTION FILE

FIELD

The present disclosure relates to communication techniques, and more particularly, to a method, a system and an apparatus for uploading and downloading a caption file.

BACKGROUND

With development of telecommunications, multimedia files become popular and are widely used due to their merits such as transmission and storage convenience and high fidelity.

There are various kinds of multimedia files. Generally, the multimedia files may be classified into several kinds, e.g. voice, image and video. Since different kinds of multimedia files have different creating and playing principles, corresponding client end players should be installed in a client end, e.g. computer, cell phone. When the client end player plays a multimedia file, besides the multimedia file, a caption file corresponding to the multimedia file is generally played.

Popular client end players provide a function of automatically adding the caption file. When a user plays a multimedia file, the client end player automatically adds a caption file in local storage or a designated path. If the multimedia file played by the user does not have a caption file in the local storage, the caption file should be downloaded.

Currently, the method for downloading a caption file is as follows. The user downloads the caption file manually from a network or from other client ends. If the user wants to upload a local caption file to a server when playing a multimedia file, the user needs to manually transmit the local caption file to the server for use of other users.

SUMMARY

Examples of the present disclosure provide a method, a system and an apparatus for uploading and downloading a caption file, so as to enable a user to upload and download a corresponding caption file when playing a multimedia file and improve the user's experience.

According to one example of the present disclosure, a method for uploading a caption file is provided. The method includes:
  receiving, by a caption server, file information of a multimedia file and file information of a caption file corresponding to the multimedia file from a client end player;
  determining, by the caption server, whether the caption server has the caption file according to the file information of the caption file and transmitting a status message indicating whether the caption server has the caption file to the client end player, to enable the client end player to upload the caption file when determining according to the status message that the caption server does not have the caption file.

According to another example of the present disclosure, a method for downloading a caption file is provided. The method includes:
  receiving, by a caption server, file information of a multimedia file from a client end player;
  searching, by the caption server, for file information of one or more caption files associated with the file information of the multimedia file according to the received file information of the multimedia file, and transmitting the file information of the one or more caption files searched out and an association degree between the file information of each of the one or more caption files and the file information of the multimedia file to the client end player, to enable the client end player to download contents of a caption file from the caption server according to the file information of the one or more caption files and the association degree between the file information of each of the one or more caption files and the file information of the multimedia file.

According to another example of the present disclosure, a system for uploading a caption file is provided. The system includes:
  a client end player, to transmit file information of a multimedia file and file information of a caption file corresponding to the multimedia file to a caption server; and upload the caption file after determining according to a status message received from the caption server that the caption server does not have the caption file; and
  the caption server, to determine whether the caption server has the caption file according to the file information of the caption file, and transmit the status message indicating whether the caption server has the caption file to the client end player.

According to another example of the present disclosure, a system for downloading a caption file is provided. The system includes: a client end player and a caption server, wherein
  the client end player is to transmit file information of a multimedia file to the caption server, and download contents of a required caption file from the caption server according to file information of one or more caption files and an association degree between the file information of each of the one or more caption files and the file information of the multimedia file transmitted by the caption server;
  the caption server is to receive the file information of the multimedia file, search for file information of one or more caption files associated with the multimedia file according to the file information of the multimedia file received, and transmit the file information of the one or more caption files searched out and the association degree between the file information of each of the one or more caption files and the file information of the multimedia file to the client end player.

According to another example of the present disclosure, a client end player is provided. The client end player includes:
  a first transmitting module, to transmit file information of a multimedia file and file information of a caption file corresponding to the multimedia file to a caption server;
  an uploading module, to upload the caption file according to a status message of the caption file transmitted by the caption server.

According to another example of the present disclosure, a caption server is provided. The caption server includes:
  a determining module, to determine whether a caption file exists in the caption server according to file information of the caption file transmitted by a client end player;
  a second transmitting module, to transmit a status message indicating that whether the caption file exists in the caption server to the client end player.

According to another example of the present disclosure, a client end player is provided. The client end player includes:
  a third transmitting module, to transmit file information of a multimedia file to a caption server;
  a downloading module, to download contents of a required caption file from the caption server according to file information of the caption file and an association degree between the file information of the caption file and the file information of the multimedia file transmitted by the caption server.

According to another example of the present disclosure, a caption server is provided. The caption server includes:

a first searching module, to search for file information of one or more caption files associated with a multimedia file according to the file information of the multimedia file transmitted by a client end player;

a fourth transmitting module, to transmit the file information of the one or more caption files searched out and an association degree between the file information of each of the one or more caption files and the file information of the multimedia file to the client end player.

In the solution provided by the present disclosure, when the user uploads the caption file, the client end player transmits the file information of the multimedia file and the file information of the caption file to the caption server to be compared with corresponding file information in the caption server, so as to determine whether the caption file exists in the caption server. If the caption file does not exist, the client end player uploads the caption file, which ensures that the caption file uploaded by the user will not repeat and saves resources of the caption server. When the user downloads the caption file, the client end player transmits the file information of the multimedia file to the caption server, the caption server searches for one or more associated caption files and selects a caption file according to the file information of the one or more caption files searched out and an association degree between the file information of each of the one or more caption files and the file information of the multimedia file. As such, the user is able to download the required caption file timely and accurately. The user does not need to search for and download the caption file manually, which improves the user's experience.

BRIEF DESCRIPTION OF THE DRAWINGS

Drawings used for describing examples of the present disclosure or prior art will be introduced briefly hereinafter to make the technical solution provided by the examples of the present disclosure or the prior art clearer. Obviously, the following drawings are merely examples. Many variations are possible without departing from the spirit of the drawings.

FIG. 3-1 is a schematic diagram illustrating an uploading method according to a third example provided by the present disclosure.

FIG. 3-2 is a schematic diagram illustrating a downloading method according to the third example of the present disclosure.

DETAILED DESCRIPTION

Hereinafter, the present disclosure will be described in further detail with reference to accompanying drawings and examples to make the technical solution and merits therein clearer.

It is found out that the prior art has the following drawbacks and shortcomings.

The existing manually downloading method is complex and the caption file cannot be added timely, which affects the user's experience. When the user uploads the caption file of the multimedia file to the server, since caption files of the same multimedia file are generally the same, if multiple users have uploaded caption files, there will be duplicated caption files, which occupies much memory space and wastes resources of the server.

Example 1

Figure 1:
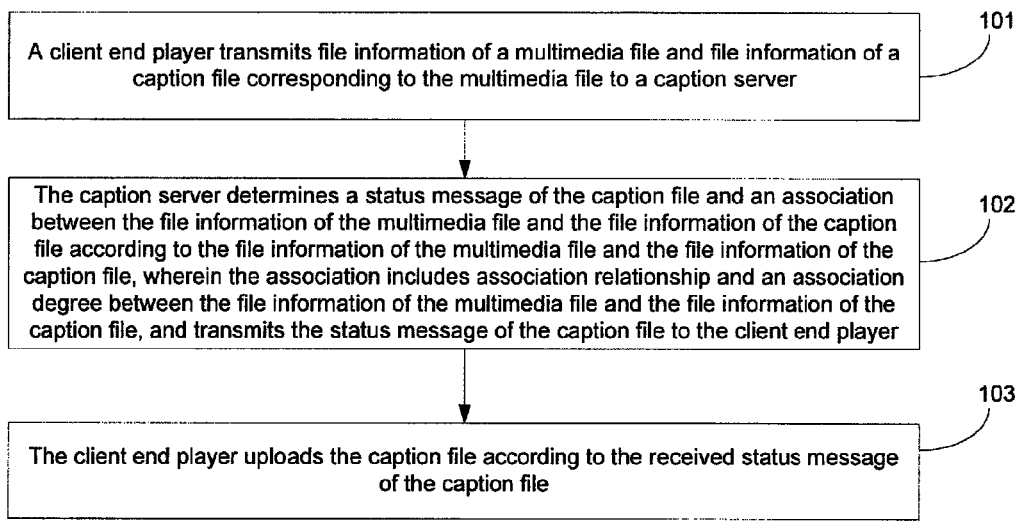
FIG. 1 is a schematic diagram illustrating an uploading method according to a first example provided by the present disclosure.

In order to realize that a corresponding caption file can be uploaded automatically when a user plays a multimedia file, an example of the present disclosure provides a method for uploading a caption file, wherein the caption file is that of a multimedia file. As shown in FIG. 1, the method includes the following steps.

Step 101, a client end player transmits file information of a multimedia file and file information of a caption file corresponding to the multimedia file to a caption server.

Step 102, the caption server determines, according to the file information of the caption file and the file information of the multimedia file, an association relationship and an association degree between the file information of the multimedia file and the file information of the caption file; the caption server determines whether there is the caption file in the caption server and transmits a status message indicating that whether the caption server stores the caption file to the client end player.

Step 103, the client end player uploads the caption file according to the status message of the caption file.

Specifically, the caption server determines whether the caption server has contents of the caption file and whether the caption server has the file information of the multimedia file according to the file information of the caption file and the file information of the multimedia file.

If the caption server does not have the contents of the caption file but has the file information of the multimedia file, the file information of the caption file is added. An association relationship between the file information of the multimedia file and the file information of the caption file is created. And a status message indicating that the caption file does not exist is transmitted to the client end player.

If the caption server does not have the contents of the caption file and does not have the file information of the multimedia file, the file information of the caption file and the file information of the multimedia file are added. The association relationship between the file information of the multimedia file and the file information of the caption file is created, and a status message indicating that the caption file does not exist is transmitted to the client end player.

If the caption server has the contents of the caption file and the file information of the multimedia file, the association degree between the file information of the multimedia file and the file information of the caption file is increased. A status message indicating that the caption file exists is transmitted to the client end player, wherein the status message includes information indicating whether the caption file exists.

Generally, when the association relationship is created, an initial association degree may be set to 1. When it is found that the caption server has the contents of the caption file and the file information of the multimedia file, the association degree may be increased. The range of the association degree may be configured flexible according to a practical situation. For example, the range of the association degree may be configured to 1 to 20. That is, when the association relationship is created, the association degree is 1. Each time the contents of the caption file and the file information of the multimedia file are found in the caption server, the association degree is increased by one. When the association degree reaches 20, it will not be increased any more even if the contents of the caption file and the file information of the multimedia file are found again.

If the caption server has the contents of the caption file but does not have the file information of the multimedia file, the file information of the multimedia file is added. An association relationship between the file information of the multimedia file and the file information of the caption file is created, and a status message indicating that the caption file exists is transmitted to the client end player.

If the client end player receives the status message indicating that the caption file exists, the client end player does not upload the caption file. If the client end player receives the status message indicating that the caption file does not exist, it uploads the caption file.

The file information of the multimedia file includes a hash value of the multimedia file. The file information of the caption file includes a hash value of the caption file. The file information of the multimedia file and that of the caption file may further include other information, which is not restricted in the example of the present disclosure.

In addition, the file information of the multimedia file further includes character information of the multimedia file. And the file information of the caption file further includes character information of the caption file.

In the method for uploading the caption file provided by the example of the present disclosure, when a user uploads a caption file, the client end player transmits the file information of the multimedia file and the file information of the caption file to the caption server, the file information of the multimedia file and the file information of the caption file are compared with corresponding file information in the caption server to determine whether the contents of the caption file exists in the caption server. The caption file is uploaded according to the determined result. And the caption server determines the association between the file information of the multimedia file and the file information of the caption file, which ensures that the caption file will not be uploaded repeatedly and thus resources of the caption server is saved.

Example 2

Figure 2:
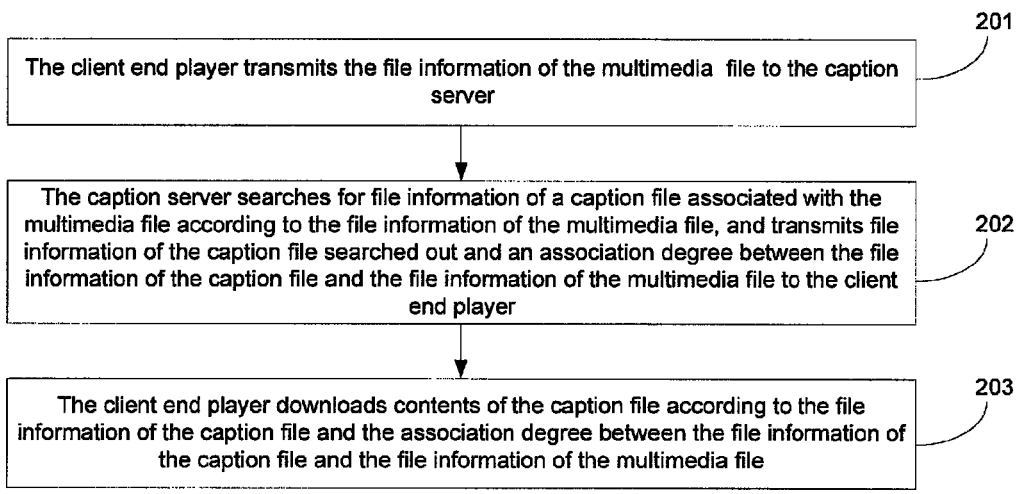
FIG. 2 is a schematic diagram illustrating an uploading method according to a second example provided by the present disclosure.

This example provides a method for downloading a caption file. As shown in FIG. 2, the method includes the following steps.

Step 201, a client end player transmits file information of a multimedia file to a caption server.

Step 202, the caption server searches for file information of one or more caption files associated with the multimedia file according to the file information of the multimedia file, and transmits the file information of the one or more caption files and an association degree between the file information of each of the one or more caption files and the file information of the multimedia file to the client end player.

Step 203, the client end player download contents of a required caption file from the caption server according to the file information of the one or more caption files and the association degree between the file information of each of the one or more caption files and the file information of the multimedia file.

Specifically, the client end player receives the file information of the one or more caption files and the association degree between the file information of each of the one or more caption files and the file information of the multimedia file, selects a caption file according to the association degrees and downloads the contents of the selected caption file from the caption server.

The caption server searches for the file information of one or more caption files associated with the multimedia file according to the file information of the multimedia file, selects a caption file according to the file information of the one or more caption files and the association degree between the file information of each of the one or more caption files and the file information of the multimedia file, transmits the file information of the selected caption file to the client end player, such that the client end player is able to download the contents of the selected caption file directly from the caption server after receiving the file information.

The file information of the multimedia file includes a hash value of the multimedia file. The file information of the caption file includes a hash value of the caption file. The file information of the multimedia file and that of the caption file may further include other information, which is not restricted in the example of the present disclosure.

In addition, the file information of the multimedia file further includes character information of the multimedia file. And the file information of the caption file further includes character information of the caption file.

The method further includes:

The caption server searches for the file information of one or more caption files associated with the multimedia file according to the hash value of the multimedia file. If no caption file is found, the caption server searches for one or more caption files matching the character information of the multimedia file according to the character information of the multimedia file, and transmits the file information of the one or more matching caption files to the client end player.

The client end player selects a caption file according to the file information of the one or more caption files and downloads contents of the selected caption file from the caption server.

In the method provided by the example of the present disclosure, when the user downloads the caption file, the client end player transmits the file information of the multimedia file to the caption server. The caption server searches for one or more associated caption files and selects a caption file according to the association degree between the file information of each of the one or more caption files searched out and the file information of the multimedia file. Thus, the user is able to download a required caption file timely and accurately. The user does not need to search for the caption file manually, which improves the user's experience.

Example 3

Figures 1, 3:
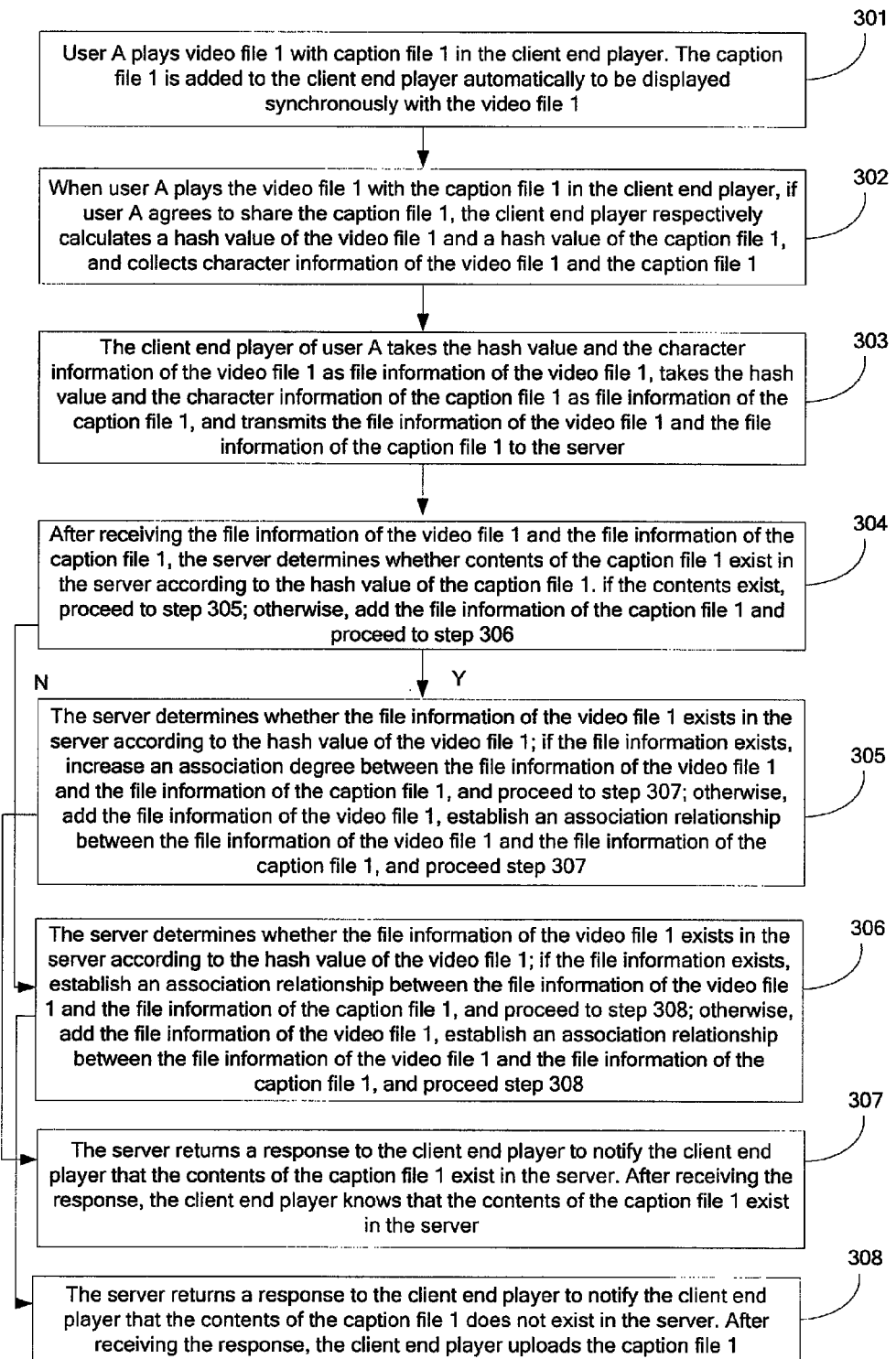
Figures 2, 3:
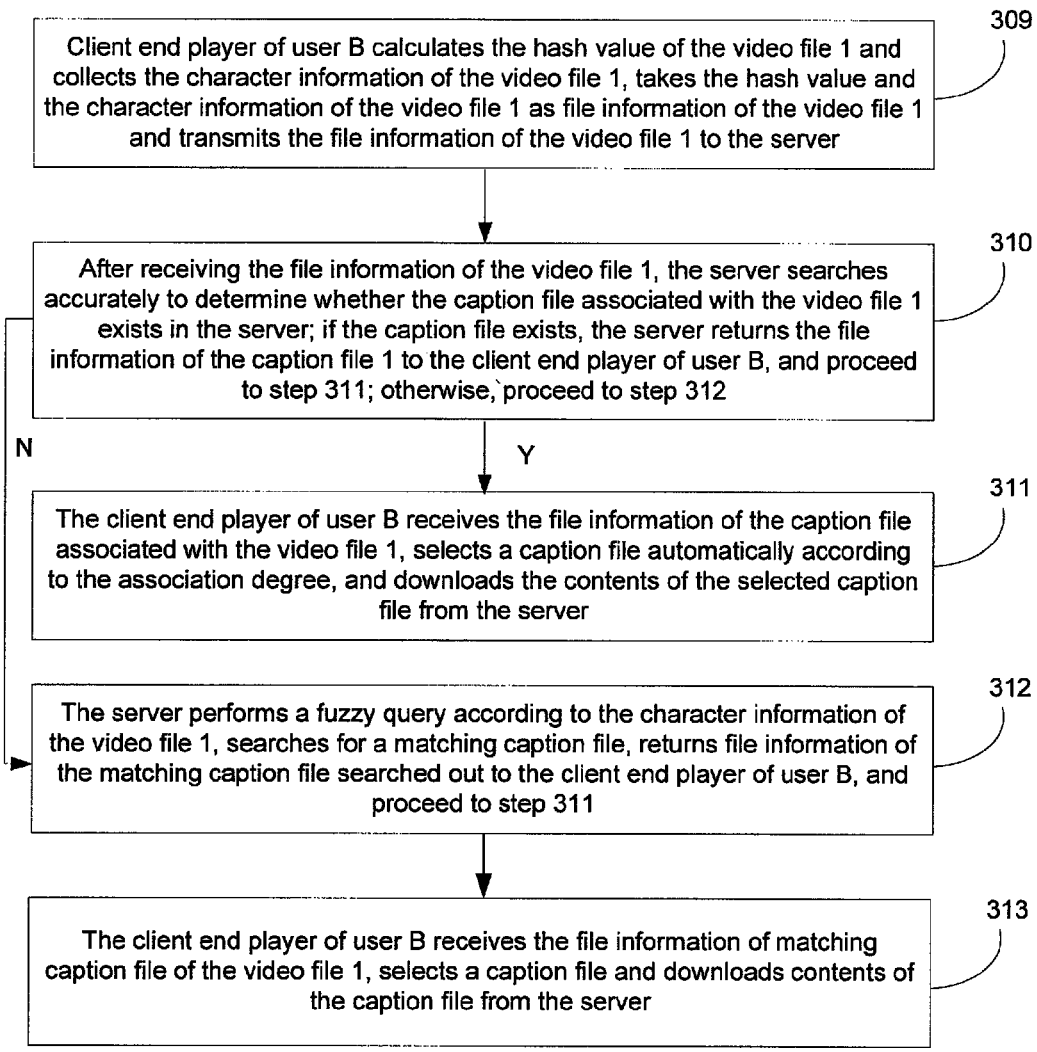

For facilitating the description, in this example, suppose that when user A plays video file 1 with caption file 1 in the client end player, caption file 1 saved in the client end is uploaded to the server; and when user B plays video file 1 in the client end player, caption file 1 is automatically obtained from the server. As shown in FIG. 3-1, the method includes the following steps.

Step 301, user A plays video file 1 with caption file 1 in the client end player. Caption file 1 is automatically added into the client end player to be displayed synchronously with the video file 1.

Video file 1 that user A plays in the client end player may be various kinds of video files such as film, teleplay, FLASH, MTV, etc., which is not restricted in the example of the present disclosure. The format of the video file 1 may be anyone of MOV, RMVB, MID, MP4, RAM, RA, MPG, VCD, DAT, SVCD, CVD, DVD, which is also not restricted in the example of the present disclosure.

The caption file 1 of the video file 1 played by user A may be saved locally by user A or saved in a designated path, e.g. a certain position in a network email box. When the user plays video file 1, the client end player automatically loads the caption file 1 saved locally or in the designated path. Thus, the caption file 1 and the video file 1 may be played synchronously. Before being played, an association relationship has been established between the video file 1 and the caption file 1, so as to facilitate the client end player to find and automatically load the caption file 1 corresponding to the video file 1 according to association relationship when user A plays the video file 1.

The client end player must support the format of the video file 1. The client end player may be any kinds of video playing apparatus such as PC, cell-phone, etc., which is not restricted in the example of the present disclosure.

Step 302, when user A plays the video file 1 with the caption file 1 in the client end player, if user A agrees to share the caption file 1, the client end player respectively calculates a hash value of the video file 1 and a hash value of the caption file 1 and collects character information of the video file 1 and character information of the caption file 1.

If user A agrees to share the caption file 1, the client end player calculates the hash value of the video file 1 and the hash value of the caption file 1 respectively according to a certain calculation criteria such as segmentation calculation method or integrated calculation method, wherein the calculation criteria adopted by the client end player may be selected flexibly according to a practical requirement, which is not restricted in the example of the present disclosure.

The hash value of a file is a value obtained by performing a logical calculation to the contents of the file. Different hash values will be obtained with respect to different files (even files having the same file name). Therefore, the hash value is an identification of each file. Files with different hash values are regarded as different files. And files with the same hash value must have the same contents (even if the files have different file names). Therefore, the hash value has a function of file checking. It may be regarded as a check code of the file. For example, it can be used to determine whether the file is correctly downloaded.

Specifically, it is possible to adopt the segmentation hash method to calculate the hash value of the video file 1. For example, respectively calculate a hash value to first 512 bytes, last 512 bytes and middle 512 bytes of the video file 1. Then combine the three hash values to obtain the hash value of the video file 1. It is also possible to adopt the integrated method to calculate the hash value of the video file 1. This is not restricted in the example of the present disclosure. Accordingly, as to the caption file 1, the hash value may be calculated according to the integrated method or the segmentation method. This is also not restricted in the example of the present disclosure.

Hash values calculated with respect to the same file using the segmentation method and the integrated method are different. The premise that the hash value of each file is unique is that, the server and the client adopt the same calculating method to calculate the hash value of the file. Furthermore, as to large video files, the calculation time is generally long due to large file size. Therefore, the segmentation method is usually adopted for such video files. As to caption files with little file size, the integrated method is usually adopted.

In the example, the hash value of the multimedia file and the hash value of the caption file are calculated to uniquely identify contents of the multimedia file and uniquely identify the file information of the caption file. In addition, the contents of the multimedia file and the file information of the caption file may also be uniquely identified by other methods, which is not restricted in the example of the present disclosure.

The character information of video file 1 collected by the client end player includes: anyone or any combination of file name, size, playing time and format of the video file 1. For example, the character information of video file 1 collected by the client end player includes: file name "Kung Fu Panda", file size 4645642764 bytes, playing time 3060 seconds, format DVD. It should be noted that, the character information of the video file 1 may be adjusted according to a practical requirement.

The character information of the caption file 1 may include: anyone or any combination of: file name, file extension name and format of the caption file 1. For example, the collected character information of the caption file 1 includes: file name "Kung Fu Panda.chs.srt", the extension name of the caption file is ".srt", the format of the caption file 1 is TXT. It should be noted that, the character information of the caption file 1 may also be adjusted according to a practical requirement.

In this step, the client end player may also only calculate the hash value of the video file 1 and the hash value of the caption file 1, but not collect the character information of the video file 1 and the character information of the caption file 1.

Step 303, the client end player of user A takes the hash value of the video file 1 and the character information of the video file 1 as file information of the video file 1, takes the hash value and the character information of the caption file 1 as file information of the caption file 1 and uploads the file information of the video file 1 and the file information of the caption file 1 to the server.

In order to reduce unnecessary information being uploaded and improve uploading efficiency, the uploading time may be adjusted. For example, after loading a caption file, the user finds that the caption file needs to be modified due to some mistakes after watching the caption file for a period of time. At this time, the uploading time may be configured. For example, it is possible to configure a time delay before the caption file being uploaded to the server, e.g. configure that after the video file 1 is played for X minutes or after the video file 1 has been played for a certain proportion such as Y %, regard the caption file 1 is correct and upload the caption file 1 to the server, wherein the values of X and Y may be adjusted according to a practical requirement or a practical operation situation.

In addition, in order to enhance security of user information, the client end player may encrypt the hash value and the character information of the video file 1 and the hash value and the character information of the caption file 1 before transmitting them to the server. In order to reduce the data amount being transmitted and improve transmission efficiency, the client end player may compress the information to be uploaded. The compression method may be selected randomly, such as using compression software. Certainly, in order to enhance the security of user information and improve the transmission efficiency, the client end player may encrypt and compress the information to be uploaded. Encryption methods such as DES and RSA may be used, which is not restricted in the example of the present disclosure.

Alternatively, the client end player may also take the hash value and the character information of the caption file 1 as the file information of the caption file 1 and upload the file information of the caption file 1 to the server firstly. After step 304, the client end player takes the hash value of the video file 1 and the character information of the video file 1 as the file information of the video file 1 and uploads the file information of the video file 1 to the server.

The server in this example may be a dedicated caption server or any other server, which is not restricted in the example of the present disclosure.

If the client end player of user A calculated only the hash value of the video file 1 and the hash value of the caption file 1 in step 302, the hash value of the video file 1 is taken as the file information of the video file 1 and is uploaded to the server, and the hash value of the caption file 1 is taken as the file information of the caption file 1 and is uploaded to the server. At this time, the character information of the video file 1 and that of the caption file 1 are not needed to be uploaded to the server.

Step 304, after receiving the file information of the video file 1 and the file information of the caption file 1, the server determines whether the contents of the caption file 1 exist in the server according to the hash value of the caption file 1. If the contents of the caption file 1 exist in the server, proceed to step 305; otherwise, add the file information into the server and proceed to step 306.

After receiving the file information of the video file 1 and the file information of the caption file 1, the server firstly determines whether the contents of the caption file 1 exist in the server according to the hash value of the caption file 1. Since caption files with the same contents correspond to the same hash value, it is possible to determine accurately whether the server has the contents of the caption file 1 according to the hash value of the caption file 1. If the contents of the caption file 1 exist in the server, i.e. there is the contents of the caption file 1, proceed to step 305; otherwise, i.e. there is no contents of the caption file 1, add the file information of the caption file 1 and proceed to step 306; wherein the file information of the caption file 1 includes: the hash value of the caption file 1 and the character information of the caption file 1.

Step 305, the server determines whether the file information of the video file 1 exists in the server according to the hash value of the video file 1. If the file information of the video file 1 exists in the server, increase an association degree between the file information of the video file 1 and the file information of the caption file 1 and proceed to step 307; otherwise, add the file information of the video file 1, establish an association relationship between the file information of the video file 1 and the file information of the caption file 1 and proceed to step 307.

If the server determines that the contents of the caption file 1 exist, the server determines whether the file information of the video file 1 exists in the server according to the hash value of the video file 1, wherein the file information of the video file 1 includes the hash value and the character information of the video file 1.

As to video files having the same contents, their corresponding hash values are the same. Therefore, it is possible to determine whether the file information of the video file 1 exists in the server according to the hash value of the video file 1. If the file information of the video file 1 exists in the server, it indicates that the file information of the video file 1 has been added in the server, since the server has determined that the caption file 1 exists in the server, the association relationship between the file information of the video file 1 and the file information of the caption file 1 must have been established. At this time, the association degree between the file information of the video file 1 and the file information of the caption file 1 is increased directly. For example, suppose the original association degree between the file information of the video file 1 and the file information of the caption file 1 is 4. At this time, it is possible to increase it to 5 or any value larger than 4.

The association information between the file information of the video file 1 and the file information of the caption file 1 includes an association degree and an association relationship. The association relationship merely indicates that there is an association between them. The association degree denotes the degree that the video file and the caption file are associated. The higher the association degree, the higher the frequency that the caption file corresponding to the video file is uploaded and download and the higher the quality of the caption file. For example, the association degree between the file information of video file 1 and the file information of caption file 1 is 7, whereas the association degree of the file information of video file 1 and the file information of caption file 2 is 4. Thus, the caption file 1 is downloaded and uploaded more frequently than the caption file 2 and has a higher quality.

If the server does not find the file information of the video file 1, the server adds the file information of the video file 1 and establishes an association relationship between the file information of video file 1 and the file information of the caption file 1, and configures an initial value for the association degree, such as 1.

Step 306, the server determines whether the file information of the video file 1 exists in the server according to the hash value of the video file 1. If the file information of the video file 1 exists in the server, establish an association relationship between the file information of the video file 1 and the file information of the caption file 1 and proceed to step 308; otherwise, add the file information of the video file 1, establish the association relationship between the file information of the video file 1 and the file information of the caption file 1 and proceed to step 308.

When the server adds the file information of the caption file 1, the server determines whether the file information of the video file 1 exists in the server according to the hash value of the video file 1, wherein the file information of the video file 1 includes the hash value and the character information of the video file 1.

Since it is determined that the file information of the video file 1 exists in the server but the caption file 1 does not exist in the server, it indicates that other users have added the file information of the video file 1 in the server but the caption file 1 is newly added. Therefore, the association relationship between the file information of the video file 1 and the file information of the caption file 1 is established and an initial value is set for the association degree, such as 1.

If the server does not find the file information of the video file 1, it adds the file information of the video file 1, establishes the association relationship between the file information of the video file 1 and the file information of the caption file 1 and sets an initial value to the association degree, such as 1.

Step 307, the server returns a response to the client end player to notify the client end player that the server has the contents of the caption file 1. After receiving the response, the client end player knows that the server has the contents of the caption file 1 and does not upload the caption file 1.

Step 308, the server returns a response to the client end player to notify the client end player that the server does not have the contents of the caption file 1. After receiving the response, the client end player uploads the caption file 1.

In addition, in step 304, after receiving the file information of the video file 1 and the file information of the caption file 1, the server firstly determines whether the contents of the caption file 1 exist in the server according to the hash value of the caption file 1. If the contents of the caption file 1 exist in the server, the process of notifying the client end player that the server has the caption file 1 in step 307 may be executed and then step 305 is executed; otherwise, after the file information of the caption file 1 is added, the process of notifying the client end player that the server does not have the caption file 1 and the client end player uploading the caption file 1 in step 308 is executed and then step 306 is executed.

The above steps 301 to 308 is a process that user A uploads the caption file 1 of the video file 1 played by the client end player. After user A uploads the video file 1, when user B plays the video file 1 in a local client end player, if there is no associated caption file in local storage, the client end player of user B downloads the caption file corresponding to the video file 1 from the server. As shown in FIG. 3-2, the process is as follows.

Step 309, the client end player of user B calculates the hash value of the video file 1 and collects the character information of the video file 1, takes the hash value and the character information of the video file 1 as the file information of the video file 1 and transmits the file information of the video file 1 to the server.

The client end player of user B may also calculate only the hash value of the video file 1 and transmits only the hash value of the video file 1 to the server without collecting the character information of the video file 1.

Step 310, after receiving the file information of the video file 1, the server searches the server accurately to determine whether there is caption file associated with the video file 1 according to the hash value of the video file 1. If yes, return the file information of the caption file searched out to the client end player of user B, and proceed to step 311; otherwise, proceed to step 312.

After receiving the file information of the video file 1, the server searches the server accurately to determine whether there is caption file associated with the video file 1 according to the hash value of the video file 1. If yes, return all caption files associated with the video file 1 to the client end player of user B; otherwise, select N caption files having relatively high association degree among all caption files and transmits the file information of the N selected caption files to the client end player of user B. For example, select caption files which have first five association degrees among all the caption files and transmit the file information of the selected caption files to the client end player of user B.

The server may also select a caption file according to a pre-defined criterion among all the caption files associated with the video file 1 and transmits the file information of the selected caption file to the client end player of user B. wherein the pre-defined criterion may be a concern degree, i.e. select a caption file with a high concern degree and transmit the file information of the selected caption file to the client end player of user B. Certainly, it is also possible to select the caption file according to other parameters such as language edition.

Step 311, after receiving the file information of the caption files associated with the video file 1, the client end player selects a caption file automatically according to the association degree, and downloads contents of the selected caption file from the server.

The client end player of user B may also present the file information of the caption files associated with the video file 1 to user B. Then user B selects a caption file manually and downloads the contents of the selected caption file from the server.

Step 312, the server performs a fuzzy query according to the character information of the video file 1, searches for matching caption files, returns file information of the matching caption files searched out to the client end player of user B, and proceeds to step 313.

When the server does not find the caption file associated with the video file 1 by searching the server accurately according to the hash value of the video file 1, the server performs the fuzzy query to a database of the server according to the character information of the video file 1 to find matching caption files. Then the server transmits the file information of the matching caption files searched out to the client end player. During the fuzzy query, a matching criterion such as matching by file name, or file size, or file format, or matching by file name and file size and file format at the same time.

The difference between the fuzzy query in this step and the accurate search in step 310 resides in that, the accurate search is performed according to the hash value of the video file 1. Since the hash value of the video file 1 is unique, the caption files searched out must be the caption file of the video file 1. For example, caption file 1 and caption file 2 are searched out according to the hash value of the video file 1. The caption file 1 and the caption file 2 may be different editions or have different qualities. But there are both the caption files of the video file 1. But the fuzzy query in this step is performed according to characters such as file name, file format and file size. What is searched out may not be the caption file of the video file 1. For example, caption file 3 and caption file 4 are searched out according to the file name, file format and file size. But the caption file 3 and the caption file 4 may not be the caption files of the video file 1. Only the character information of them meets the criterion.

Step 313, the client end player of user B receives the file information of the caption files matching the video file 1, selects a caption file and downloads the selected caption file from the server.

The client end player of user B may also present the file information of the caption files matching the video file 1 obtained by the fuzzy query to user B. User B selects a caption file manually and downloads the selected caption file from the server.

Besides the file information of the video file and the file information of the caption file uploaded by users, the caption server has a large caption library including caption files come from various sources, e.g. a caption library maintained and trained manually, a media information library and association degrees. The caption server needs to be maintained constantly. With update of the caption server, a latest caption file may be selected preferably. Or, a new caption file may overlap an original caption file with the same contents during updating of the caption file.

In the method provided by the example of the present disclosure, when the user uploads the caption file, the client end player transmits the file information of the multimedia file and the file information of the caption file to the caption server to be compared with corresponding information in the caption server, so as to determine whether the contents of the caption file exist in the caption server. The caption file is uploaded according to the determined result. And an association is configured between the file information of the caption file and the file information of the multimedia file in the caption server, which ensures that the caption file uploaded by the user will not repeat and saves resources of the caption server. When the user downloads a caption file, the client end player transmits file information of the multimedia file to the caption server. The caption server searches for one or more associated caption files and selects a caption file according to the file information of the one or more caption files searched out and an association degree between the file information of each of the one or more caption files searched out and the file information of the multimedia file. Thus, the user is able to download a required caption file timely and accurately. The user needs not to search and download the caption file manually, which improves the user's experience.

Example 4

Figure 4:
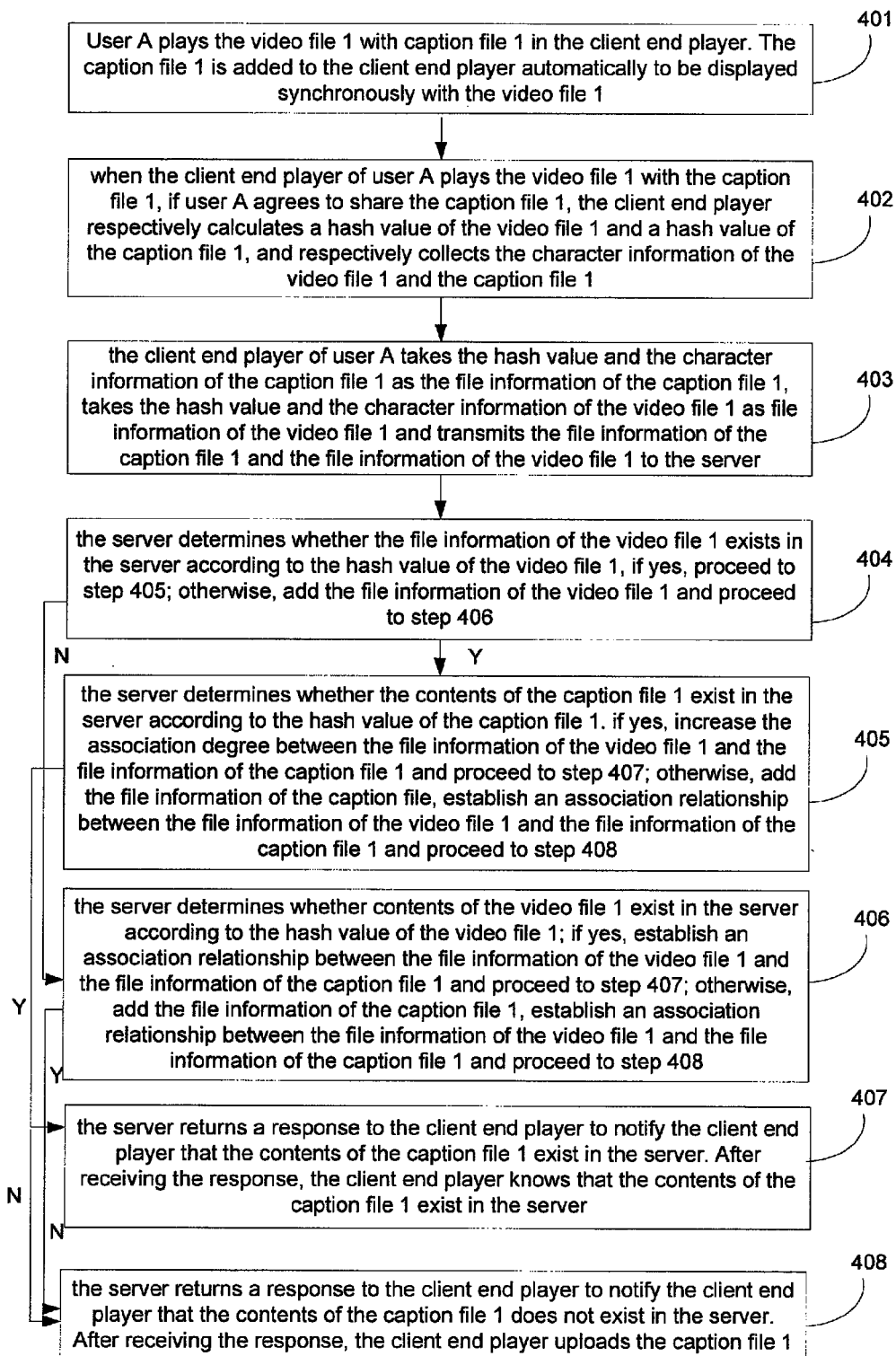
FIG. 4 is a schematic diagram illustrating an uploading method and a downloading method according to a fourth example of the present disclosure.

For facilitating the description, still suppose that user A uploads caption file 1 saved locally to the server when the client end player plays video file 1 with the caption file 1. When the client end player of user B plays the video file 1, it automatically obtains the caption file 1 from the server. As shown in FIG. 4, the method includes the following steps.

Step 401, user A plays the video file 1 with the caption file 1 in the client end player. The caption file 1 is automatically added to the client end player to be displayed synchronously with the video file 1.

The detailed process is as shown in step 301 of example 2.

Step 402, when the client end player of user A plays the video file 1 with the caption file 1, if user A agrees to share the caption file 1, the client end player respectively calculates a hash value of the video file 1 and a hash value of the caption file 1, and respectively collects the character information of the video file 1 and the caption file 1.

If user A does not agree to share the caption file 1, the procedure ends.

The detailed process is as shown in step 302 of example 2.

Step 403, the client end player of user A takes the hash value and the character information of the caption file 1 as the file information of the caption file 1, takes the hash value and the character information of the video file 1 as file information of the video file 1 and transmits the file information of the caption file 1 and the file information of the video file 1 to the server.

In order to reduce unnecessary information being uploaded and increase uploading efficiency, the uploading time may be adjusted. The details are as shown in step 303.

In addition, in order to enhance security of user information, the client end player may encrypt the hash value and the character information of the video file 1 and the hash value and the character information of the caption file 1 before transmitting them to the server. Encryption methods such as DES and RSA may be used, which is not restricted in the example of the present disclosure. In order to reduce the data amount being transmitted and improve transmission efficiency, the client end player may compress the information to be uploaded. The compression method may be selected randomly, such as using compression software. Certainly, in order to enhance the security of user information and improve the transmission efficiency, the client end player may encrypt and compress the information to be uploaded.

Step 404, the server determines whether the file information of the video file 1 exists in the server according to the hash value of the video file 1, if the file information of the video file 1 exists, proceed to step 405; otherwise, add the file information of the video file 1 and proceed to step 406.

Step 405, the server determines whether the contents of the caption file 1 exist in the server according to the hash value of the caption file 1. If the contents of the caption file 1 exist, increase the association degree between the file information of the video file 1 and the file information of the caption file 1 and proceed to step 407; otherwise, add the file information of the caption file, establish an association relationship between the file information of the video file 1 and the file information of the caption file 1 and proceed to step 408.

Step 406, the server determines whether the contents of the caption file 1 exist in the server according to the hash value of the caption file 1; if the contents of the caption file 1 exist, establish an association relationship between the file information of the video file 1 and the file information of the caption file 1 and proceed to step 407; otherwise, add the file information of the caption file 1, establish an association relationship between the file information of the video file 1 and the file information of the caption file 1 and proceed to step 408.

Step 407, the server returns a response to the client end player to notify the client end player that the contents of the caption file 1 exist in the server, e.g. returns a notification or an instruction, which is not restricted in the example of the present disclosure. After receiving the response, the client end player knows that the contents of the caption file 1 exist in the server.

Step 408, the server returns a response to the client end player to notify the client end player that the contents of the caption file 1 does not exist in the server. After receiving the response, the client end player uploads the caption file 1.

The above steps 401 to 408 is a process that user A uploads the caption file 1 of the video file 1 played by the client end player of user A to the server. Different from example 2, the server firstly determines whether the file information of the video file 1 exists and then determines whether the contents of the caption file 1 exist. After user A uploads the caption file 1, when user B plays the video file 1 in a local client end player, if there is no associated caption file in local storage of the client end player of user B, the client end player of user B downloads the caption file 1 corresponding to the video file 1 from the server. The detailed process is shown in step 309 to 313 of example 2. The process is the same and will not be repeated herein.

Example 5

Figure 5:
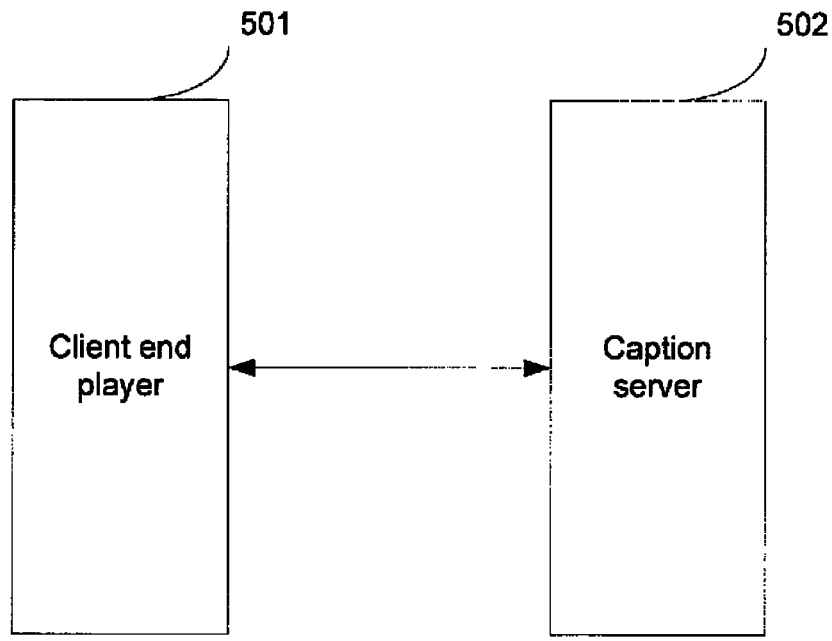
FIG. 5 is a schematic diagram illustrating a structure of an uploading system according to a fifth example of the present disclosure.

This example provides a system for uploading a caption file. As shown in FIG. 5, the system includes a client end player 501 and a caption server 502.

The client end player 501 is to transmit file information of a multimedia file and file information of a caption file corresponding to the multimedia file to the caption server 502, and to upload the caption file after determining according to a status message transmitted by the caption server 502 that the caption file does not exist in the caption server 502.

The caption server 502 is to determine an association relationship and an association degree between the file information of the multimedia file and the file information of the caption file according to the file information of the multimedia file and the file information of the caption file, determine whether the caption file exists in the caption server and transmit the status message indicating whether the caption file exists in the caption server to the client end player 501.

The caption server 502 is to determine whether the caption server 502 has contents of the caption file and the file information of the multimedia file according to the file information of the caption file and the file information of the multimedia file.

If the caption server 502 does not have the contents of the caption file but has the file information of the multimedia file, the caption server 502 adds the file information of the caption file, establishes an association relationship between the file information of the multimedia file and the file information of the caption file, and transmits a status message indicating that the caption file does not exist to the client end player 501.

If the caption server 502 does not have the contents of the caption file and the file information of the multimedia file, the caption server 502 adds the file information of the multimedia file and the file information of the caption file, establishes an association relationship between the file information of the multimedia file and the file information of the caption file, and transmits a status message indicating that the caption file does not exist to the client end player 501.

If the caption server 502 has the contents of the caption file and the file information of the multimedia file, increase an association degree between the file information of the multimedia file and the file information of the caption file, and transmits a status message indicating that the caption file exists to the client end player 501.

If the caption server 502 has the contents of the caption file but does not have the file information of the multimedia file, add the file information of the multimedia file, establish an association relationship between the file information of the multimedia file and the file information of the caption file, and transmit a status message indicating that the caption file exists to the client end player 501.

The client end player 501 is to receive the status message of the caption file transmitted by the caption server 502, if the status message indicates that the caption file exists, the client end player 501 does not upload the caption file; if the status message indicates that the caption file does not exist, the client end player 501 uploads the caption file.

The file information of the multimedia file includes the hash value of the multimedia file. The file information of the caption file includes the hash value of the caption file.

The file information of the multimedia file further includes the character information of the multimedia file. The file information of the caption file further includes the character information of the caption file.

In the system provided by the example of the present disclosure, when the user uploads the caption file, the file information of the caption file and the file information of the multimedia file are transmitted to the caption server through the client end player to be compared with corresponding file information in the caption server, so as to determine whether the contents of the caption file exist in the caption server. And the caption file is uploaded according to the determined result. An association relationship between the file information of the multimedia file and the file information of the caption file is configured at the caption server, which ensures that the caption file being uploaded will not repeat and saves resources of the caption server.

Example 6

Figure 6:
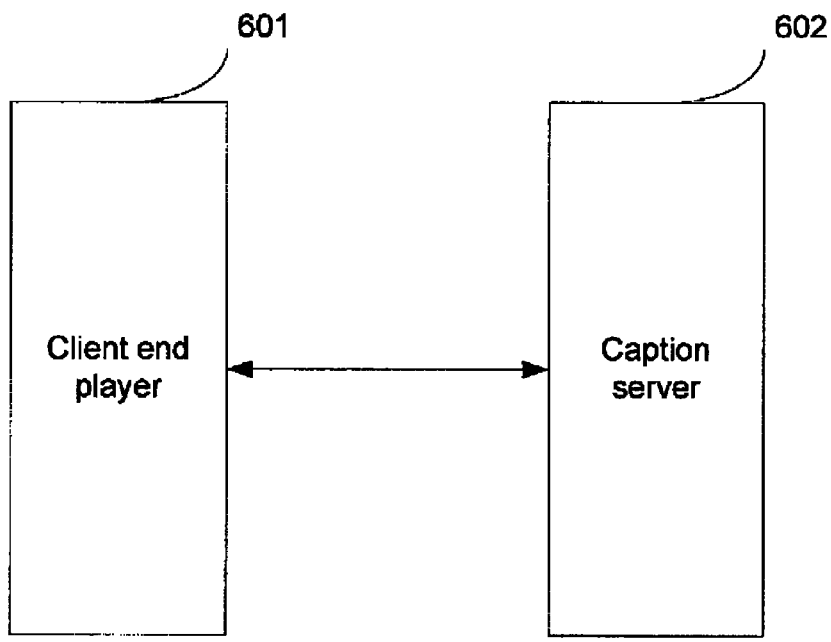
FIG. 6 is a schematic diagram illustrating a structure of a downloading system according to a sixth example of the present disclosure.

This example provides a system for downloading a caption file. As shown in FIG. 6, the system includes: a client end player 601 and a caption server 602.

The client end player 601 is to transmit file information of a multimedia file to the caption server 602, and download contents of a caption file from the caption server 602 according to file information of the caption file transmitted by the caption server 602 and an association degree between the file information of the caption file and the file information of the multimedia file.

The caption server 602 is to receive the file information of the multimedia file, search for file information of one or more caption files associated with the multimedia file, and transmit the file information of the one or more caption files searched out and an association degree between the file information of each of the one or more caption files searched out and the file information of the multimedia file to the client end player 601.

The client end player 601 is to receive the file information of the one or more caption files and the association degree between the file information of each of the one or more caption files searched out and the file information of the multimedia file transmitted by the caption server 602, select a caption file according to the association degrees and download contents of the selected caption file from the caption server 602.

The caption server 602 is to search for the file information of one or more caption files associated with the multimedia file according to the file information of the multimedia file received, select a caption file according to the file information of the one or more caption files and the association degree between the file information of each of the one or more caption files searched out and the file information of the multimedia file, and transmit the file information of the selected caption file to the client end player 601, such that the client end player can directly download contents of the selected caption file from the caption server 602 after receiving the file information of the selected caption file.

The file information of the multimedia file includes the hash value of the multimedia file and may further include the character information of the multimedia file. The file information of the caption file includes the hash value of the caption file and may further include the character information of the caption file.

The caption server 602 is further to search the caption server 602 for one or more matching caption file according to the character information of the multimedia file if no caption file associated with the multimedia file is found according to the hash value of the multimedia file, and transmit the file information of the one or more matching caption files to the client end player 601.

In the system provided by the example of the present disclosure, when the user downloads the caption file, the client end player transmits the file information of the multimedia file to the caption server. The caption server searches for one or more associated caption files and selects a caption file according to the file information of the one or more caption files searched out and the association degree between the file information of each caption file searched out and the file information of the multimedia file, such that the user is able to download a required caption file timely and accurately. The user needs not to search and download the caption file manually, which improves the user's experience.

Example 7

Figure 7:
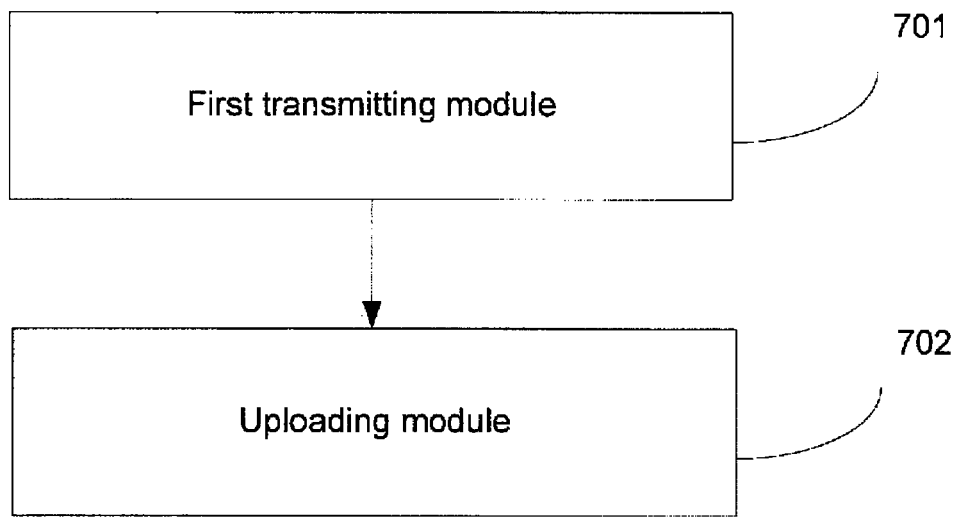
FIG. 7 is a schematic diagram illustrating a structure of a client end player according to a seventh example of the present disclosure.

This example provides a client end player. As shown in FIG. 7, the client end player includes:

a first transmitting module 701, to transmit file information of a multimedia file and file information of a caption file corresponding to the multimedia file to a caption server;

an uploading module 702, to upload the caption file according to a status message of the caption file transmitted by the caption server.

The uploading module 702 includes:

a first receiving unit, to receive the status message of the caption file transmitted by the caption server;

an uploading unit, to upload the caption file if the status message received by the first receiving unit indicates that the caption file does not exist, and not upload the caption file if the status message received by the first receiving unit indicates that the caption file exists.

In the client end player provided by the example of the present disclosure, when the user uploads the caption file, the client end player transmits the file information of the multimedia file and the file information of the caption file to the caption server to be compared with corresponding information in the caption server. The caption file is uploaded according to the determined result of the caption server, which ensures that the caption file uploaded by the user is not repeated and saves resources of the caption server.

Example 8

Figure 8:
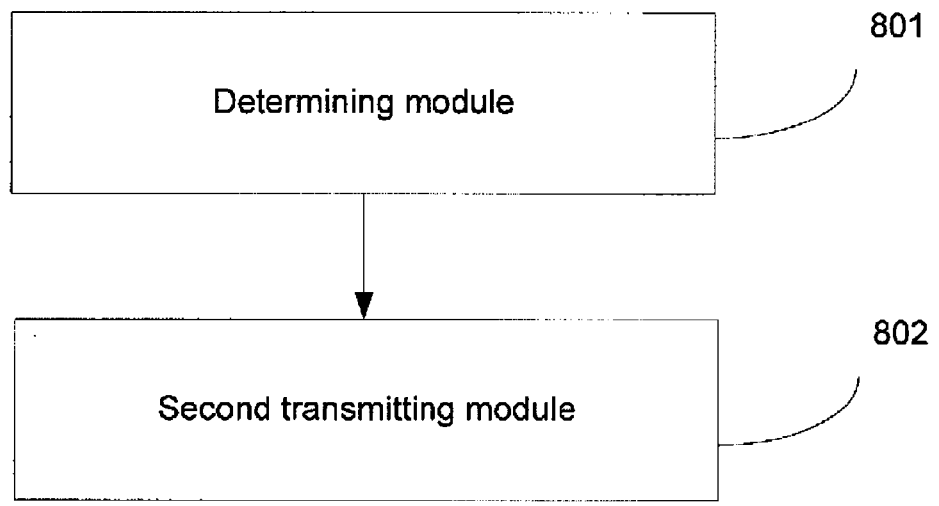
FIG. 8 is a schematic diagram illustrating a structure of a caption server according to an eighth example of the present disclosure.

This example provides a caption server. As shown in FIG. 8, the caption server includes:

a determining module 801, to determine an association relationship and an association degree between file information of a multimedia file and file information of a caption file transmitted by a client end player according to the file information of the caption file and the file information of the multimedia file, and determine whether the caption file exists in the caption server;

a second transmitting module 802, to transmit a status message indicating that whether the caption file exist in the caption server to the client end player.

The determining module 801 includes:

a searching unit, to search the caption server according to the file information of the caption file and the file information of the multimedia file to determine whether the contents of the caption file and the file information of the multimedia file exist in the caption server;

a first processing unit, to add the file information of the multimedia file and establish an association relationship between the file information of the multimedia file and the file information of the caption file if it is determined that caption server does not have the contents of the caption file but has the file information of the multimedia file;

a second processing unit, to add the file information of the caption file and the file information of the multimedia file and establish an association relationship between the file information of the caption file and the file information of the multimedia file if it is determined that the caption server does not have the contents of the caption file and the file information of the multimedia file;

a third processing unit, to increase the association degree between the file information of the caption file and the file information of the multimedia file if it is determined that the caption server has the contents of the caption file and the file information of the multimedia file;

a fourth processing unit, to add the file information of the multimedia file and establish an association relationship between the file information of the caption file and the file information of the multimedia file if it is determined that the caption server has the contents of the caption file but does not have the file information of the multimedia file.

According to the caption server provided by the example of the present disclosure, when the user uploads the caption file, it is determined that whether the contents of the caption file exist in the caption server according to the file information of the caption file and the file information of the multimedia file transmitted by the client end player. A response message is transmitted to the client end player according to the determined result, such that the client end player is able to upload the caption file if the caption server does not have the caption file and not upload the caption file if the caption server has the caption file, which ensures that the caption file uploaded by the user is not repeated and saves resources of the caption server.

Example 9

Figure 9:
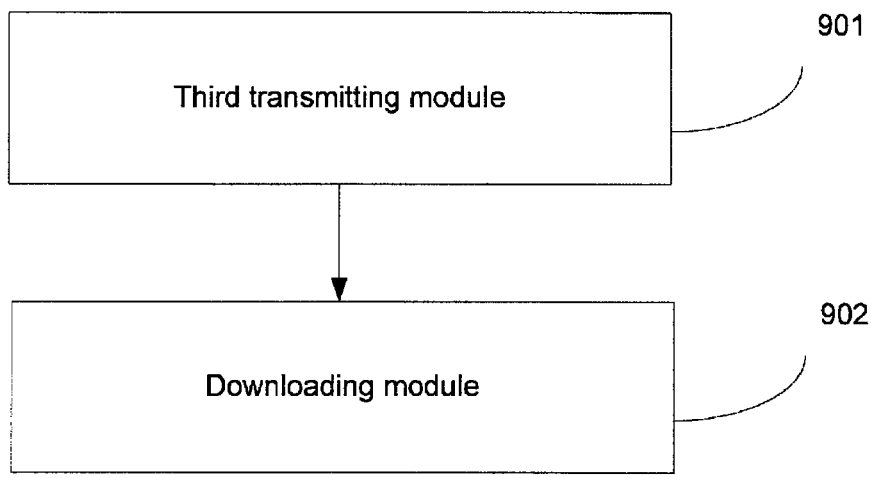
FIG. 9 is a schematic diagram illustrating a structure of a client end player according to a ninth example of the present disclosure.

This example provides a client end player. As shown in FIG. 9, the client end player includes:

a third transmitting module 901, to transmit file information of a multimedia file to a caption server;

a downloading module 902, to download contents of a caption file from the caption server according to file information of one or more caption files and an association degree between the file information of each of the one or more caption files and the file information of the multimedia file transmitted by the caption server.

The downloading module 902 includes:

a second receiving unit, to receive file information of the one or more caption files and the association degree between the file information of each of the one or more caption files and the file information of the multimedia file transmitted by the caption server;

a first selecting unit, to select a caption file according to the file information of the one or more caption files and the association degree between the file information of each of the one or more caption files and the file information of the multimedia file, and download contents of the selected caption file from the caption file.

According to the client end player provided by the example of the present disclosure, when the user downloads the caption file, the client end player transmits the file information of the multimedia file to the caption server. The caption server searches for one or more associated caption files and selects a caption file according to the file information of the one or more caption files and the association degree between the file information of each of the one or more caption file and the file information of the multimedia file, such that the user is able to download a required caption file timely and accurately. The user needs not to search and download the caption file manually, which improves the user's experience.

Example 10

Figure 10:
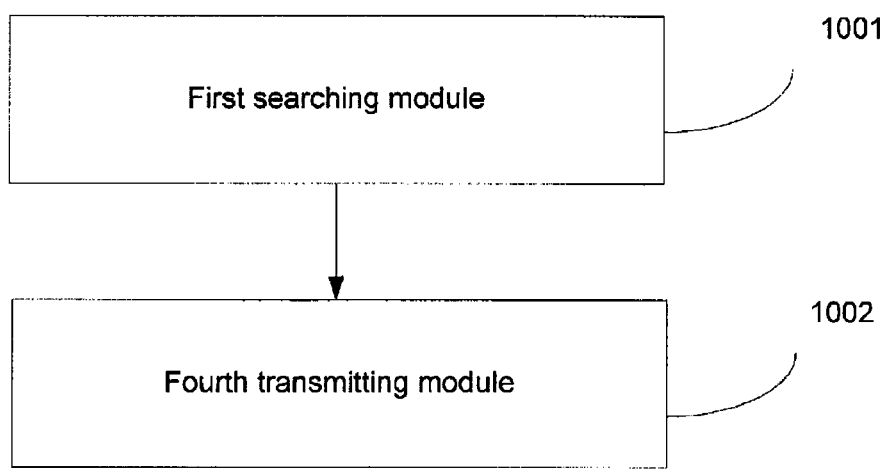
FIG. 10 is a schematic diagram illustrating a structure of a caption server according to tenth example of the present disclosure.

This example provides a caption server. As shown in FIG. 10, the caption server includes:

a first searching module 1001, to search for file information of one or more caption files associated with a multimedia file according to the file information of the multimedia file transmitted by the client end player;

a fourth transmitting module 1002, to transmit the file information of the one or more caption files searched out and an association degree between the file information of each of the one or more caption files and the file information of the multimedia file to the client end player.

The first searching module 1001 includes:

a searching unit, to search for the file information of the one or more caption files associated with the multimedia file according to the file information of the multimedia file transmitted by the client end player;

a second selecting unit, to select a caption file according to the file information of the one or more caption files searched out and the association degree between the file information of each of the one or more caption files and the file information of the multimedia file, transmit the file information of the selected caption file to the client end player, such that the client end player is able to directly download the contents of the selected caption file from the caption server after receiving the file information of the selected caption file.

The caption server further includes:

a second searching module, to search the caption server for one or more caption files matching the character information of the multimedia file according to the character information of the multimedia file if no caption file associated with the file information of the multimedia file is found according to the hash value of the multimedia file, transmit the file information of the one or more caption files searched out to the client end player, such that the client end player is able to select a caption file according to the file information of the one or more caption files and download contents of the selected caption file from the caption server.

According to the caption server provided by the example of the present disclosure, when the user downloads the caption file, the file information of the caption file is received. The caption file associated with the multimedia file and the association degree between the file information of the caption file and the file information of the multimedia file are searched out and transmitted to the client end player. As such, the user can download a required caption file timely and accurately and does not need to search and download the caption file, which improves the user's experience.

The term "receive" in the examples of the present disclosure may be comprehended as obtaining information from other modules initiatively or receiving information from other modules.

Those with ordinary skill in the art should know that the drawings are merely schematic diagrams of the examples. Not all modules and steps in the drawings are necessary in the examples.

Those with ordinary skill in the art should also know that the modules in the apparatuses of the examples may be disposed in the apparatuses of the examples or in one or several apparatuses of the examples after corresponding location modification. The modules in the examples may be combined into one module or divided into multiple sub-modules.

The sequence numbers of the examples are merely for description and do not user for denoting the preference of the examples.

Some steps in the examples of the present disclosure may be implemented by software. The software program is stored in a computer-readable storage medium, such as CD or hard disk.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for uploading a caption file, comprising:

transmitting, by a client end player, file information of a multimedia file and file information of a caption file corresponding to the multimedia file to a caption server;

determining, by the caption server, an association relationship and an association degree between the file information of the multimedia file and the file information of the caption file according to the file information of the multimedia file and the file information of the caption file, and determining whether the caption server has the caption file and transmitting a status message indicating whether the caption server has the caption file to the client end player; and uploading, by the client end player, the caption file when determining according to the status message that the caption server does not have the caption file, wherein determining, by the caption server, whether the caption server has contents of the caption file and the file information of the multimedia file according to the file information of the multimedia file and the file information of the caption file;

if the caption server does not have the contents of the caption file but has the file information of the multimedia file, adding, by the caption server, the file information of the caption file, establishing an association relationship between the file information of the multimedia file and the file information of the caption file, and transmitting a status message indicating that the caption server does not have the caption file to the client end player;

if the caption server does not have the contents of the caption file and the file information of the multimedia file, adding, by the caption server, the file information of the caption file and the file information of the multimedia file, establishing an association relationship between the file information of the caption file and the file information of the multimedia file, and transmitting a status message indicating that the caption server does not have the caption file to the client end player;

if the caption server has the contents of the caption file and the file information of the multimedia file, increasing, by the caption server, the association degree between the file information of the multimedia file and the file information of the caption file, and transmitting a status message indicating that the caption server has the caption file to the client end player;

if the caption sever has the contents of the caption file but does not have the file information of the multimedia file, adding, by the caption server, the file information of the multimedia file, establishing an association relationship between the file information of the multimedia file and the file information of the caption file, and transmitting a status message indicating that the caption server has the caption file to the client end player; and uploading, by the client end player, the caption file after receiving the status message indicating that the caption server does not have the caption file, and not uploading the caption file after receiving the status message indicating that the caption server has the caption file.

2. The method of claim 1, wherein the file information of the multimedia file comprises a hash value of the multimedia file; the file information of the caption file comprises a hash value of the caption file.

3. A system for uploading a caption file, comprising:

a client end player, to transmit file information of a multimedia file and file information of a caption file corresponding to the multimedia file to a caption server; and upload the caption file after determining according to a status message received from the caption server that the caption server does not have the caption file; and the caption server, to determine an association relationship and an association degree between the file information of the multimedia file and the file information of the caption file according to the file information of the multimedia file and the file information of the caption file, determine whether the caption server has the caption file, and transmit the status message indicating whether the caption server has the caption file to the client end player, wherein the caption server is further to determine whether the caption server has contents of the caption file and the file information of the multimedia file according to the file information of the multimedia file and the file information of the caption file;

if the caption server does not have the contents of the caption file but has the file information of the multimedia file, the caption server is to add the file information of the caption file in the caption server, establish an association relationship between the file information of the multimedia file and the file information of the caption file, and transmit a status message indicating that the caption file does not exist to the client end player;

if the caption server does not have the contents of the caption file and the file information of the multimedia file, the caption server is to add the file information of the multimedia file and the file information of the caption file in the caption server, establish an association relationship between the file information of the multimedia file and the file information of the caption file, and transmit a status message indicating that the caption file does not exist to the client end player;

if the caption server has the contents of the caption file and the file information of the multimedia file, the caption server is to increase an association degree between the file information of the multimedia file and the file information of the caption file, and transmit a status message indicating that the caption file exists to the client end player;

if the caption server has the contents of the caption file but does not have the file information of the multimedia file, the caption server is to add the file information of the multimedia file in the caption server, establish an association relationship between the file information of the multimedia file and the file information of the caption file, and transmit a status message indicating that the caption file exists to the client end player;

the client end player is further to receive the status message of the caption file transmitted by the caption server, and upload the caption file if the status message indicates that the caption file does not exist, and does not upload the caption file if the status message indicates that the caption file exists.

4. The system of claim 3, wherein the file information of the multimedia file comprises a hash value of the multimedia file; the file information of the caption file comprises a hash value of the caption file.

5. A caption server, comprising:

a determining module, to determine whether a caption file exists in the caption server according to file information of the caption file transmitted by a client end player;

a second transmitting module, to transmit a status message indicating that whether the caption file exists in the caption server to the client end player, wherein the determining module comprises:

a searching unit, to search the caption server according to the file information of the caption file and file information of a multimedia file to determine whether contents of the caption file and the file information of the multimedia file exist in the caption server;

a first processing unit, to add the file information of the multimedia file in the caption server and establish an association relationship between the file information of the multimedia file and the file information of the caption file if it is determined that caption server does not have the contents of the caption file but has the file information of the multimedia file;

a second processing unit, to add the file information of the caption file and the file information of the multimedia file and establish the association relationship between the file information of the caption file and the file information of the multimedia file if it is determined that the caption server does not have the contents of the caption file and the file information of the multimedia file;

a third processing unit, to increase an association degree between the file information of the caption file and the file information of the multimedia file if it is determined that the caption server has the contents of the caption file and the file information of the multimedia file;

a fourth processing unit, to add the file information of the multimedia file and establish the association relationship between the file information of the caption file and the file information of the multimedia file if it is determined that the caption server has the contents of the caption file but does not have the file information of the multimedia file.

* * * * *